(12) United States Patent
Davidson, Sr. et al.

(10) Patent No.: US 7,775,231 B2
(45) Date of Patent: *Aug. 17, 2010

(54) RETROFITTING A FIRE HYDRANT WITH A REPLACEMENT HYDRANT BODY CONTAINING A SECONDARY VALVE

(75) Inventors: Tom R. Davidson, Sr., Griffin, GA (US); David Phillips, Roswell, GA (US); Anthony Ferrari, McDonough, GA (US); David Michael Walden, Sharpsburg, GA (US)

(73) Assignee: Davidson Hydrant Technologies, Inc., Sunny Side, GA (US)

( * ) Notice: Subject to any disclaimer, the term of this patent is extended or adjusted under 35 U.S.C. 154(b) by 157 days.

This patent is subject to a terminal disclaimer.

(21) Appl. No.: 11/838,534

(22) Filed: Aug. 14, 2007

(65) Prior Publication Data

US 2008/0135100 A1 Jun. 12, 2008

Related U.S. Application Data

(63) Continuation-in-part of application No. 11/372,947, filed on Mar. 9, 2006, now Pat. No. 7,428,910, which is a continuation-in-part of application No. 10/997,733, filed on Nov. 23, 2004, now Pat. No. 7,055,544, which is a continuation-in-part of application No. 10/309,646, filed on Dec. 4, 2002, now Pat. No. 6,868,860.

(51) Int. Cl.
*E03B 9/02* (2006.01)
*F16K 15/18* (2006.01)

(52) U.S. Cl. .................. 137/15.02; 137/299; 137/300; 137/614.2

(58) Field of Classification Search .................. 137/299, 137/300, 272, 614.2, 15.02
See application file for complete search history.

(56) References Cited

U.S. PATENT DOCUMENTS

| 154,087 A | 8/1874 | Roberts |
| 726,369 A | 4/1903 | Sullivan |

(Continued)

FOREIGN PATENT DOCUMENTS

CH 191132 3/1937

(Continued)

OTHER PUBLICATIONS

PCT/US2003/37681 International Search Report mailed May 4, 2004.

(Continued)

*Primary Examiner*—Kevin L Lee
(74) *Attorney, Agent, or Firm*—Kilpatrick Stockton LLP

(57) ABSTRACT

The present invention relates to methods and devices for retrofitting fire hydrants with additional structure for reducing the potential that those with ill intent can foul municipal water supplies by introducing toxins or other materials into fire hydrants. Various embodiments include a replacement hydrant body having an enlarged diameter portion that can be installed to replace an existing hydrant body. The replacement hydrant body can include a secondary valve comprising a seat, biasing structure, and a restriction member to close off portions of the hydrant otherwise available for receipt of toxic or other materials when the fire hydrant nozzle cap is unscrewed and open.

22 Claims, 11 Drawing Sheets

U.S. PATENT DOCUMENTS

| | | | |
|---|---|---|---|
| 1,562,223 | A | 11/1925 | Gannestad |
| 1,601,993 | A | 10/1926 | Blake |
| 2,083,319 | A | 6/1937 | Daviet |
| 2,109,187 | A | 2/1938 | Vogel |
| 2,244,993 | A | 6/1941 | Hollifield |
| 2,515,770 | A | 7/1950 | Gronberg |
| 2,580,199 | A | 12/1951 | Schmid |
| 3,017,896 | A | 1/1962 | Papacek |
| 3,035,609 | A | 5/1962 | Dyer |
| 3,158,170 | A | 11/1964 | Tubbs |
| 3,294,109 | A | 12/1966 | Smith |
| 3,380,471 | A | 4/1968 | Mueller et al. |
| 3,475,978 | A | 11/1969 | Dunton |
| 3,566,905 | A | 3/1971 | Noland |
| 3,586,019 | A | 6/1971 | Thomas et al. |
| 3,770,000 | A | 11/1973 | Murdock et al. |
| 3,858,599 | A * | 1/1975 | Carlson ............. 137/218 |
| 3,939,861 | A | 2/1976 | Thompson et al. |
| 3,952,770 | A | 4/1976 | Botnick |
| 3,961,642 | A | 6/1976 | Thomas et al. |
| 3,980,097 | A | 9/1976 | Ellis |
| 4,022,421 | A | 5/1977 | Carlin |
| 4,139,931 | A | 2/1979 | Royce |
| 4,307,746 | A * | 12/1981 | Rifat ............. 137/291 |
| 4,393,891 | A | 7/1983 | Snoek et al. |
| 4,440,190 | A | 4/1984 | Barbe |
| 4,475,570 | A | 10/1984 | Pike et al. |
| 4,602,654 | A | 7/1986 | Stehling et al. |
| 4,791,952 | A | 12/1988 | Laurel |
| 4,813,378 | A | 3/1989 | Lapp |
| 4,909,270 | A | 3/1990 | Enterante et al. |
| 5,029,603 | A | 7/1991 | Ackroyd |
| 5,129,416 | A | 7/1992 | Ackroyd |
| 5,549,133 | A | 8/1996 | Sigelakis |
| 5,609,179 | A | 3/1997 | Knapp |
| 5,622,202 | A | 4/1997 | Etter et al. |
| 6,058,957 | A | 5/2000 | Honigsbaum |
| 6,150,037 | A | 11/2000 | Saijo et al. |
| 6,401,745 | B1 | 6/2002 | Corder |
| 6,488,048 | B2 | 12/2002 | Kuhmayer et al. |
| 6,769,446 | B1 | 8/2004 | Ball et al. |
| 6,868,860 | B2 * | 3/2005 | Davidson ............. 137/299 |
| 6,910,495 | B2 | 6/2005 | Lafalce |
| 7,055,544 | B2 | 6/2006 | Davidson |
| 7,128,083 | B2 | 10/2006 | Fleury, Jr. |
| 7,174,911 | B2 | 2/2007 | Davidson |
| 7,240,688 | B2 * | 7/2007 | Davidson et al. ......... 137/15.02 |
| 7,428,910 | B2 | 9/2008 | Davidson et al. |
| 7,575,017 | B2 * | 8/2009 | Davidson et al. ............. 137/299 |
| 2004/0154659 | A1 | 8/2004 | Lafalce |
| 2005/0067016 | A1 | 3/2005 | Wigzell |
| 2006/0108002 | A1 | 5/2006 | Davidson |
| 2006/0201551 | A1 | 9/2006 | Davidson, Sr. et al. |
| 2006/0207657 | A1 | 9/2006 | Davidson et al. |
| 2007/0157972 | A1 | 7/2007 | Hendey |
| 2007/0272300 | A1 | 11/2007 | Davidson et al. |
| 2008/0023072 | A1 | 1/2008 | Fleury, Jr. et al. |
| 2008/0083458 | A1 | 4/2008 | Davidson et al. |

FOREIGN PATENT DOCUMENTS

| | | |
|---|---|---|
| CH | 675139 | 8/1990 |
| DE | 229997 | 1/1911 |
| DE | 236645 | 11/1911 |
| DE | 639655 | 12/1936 |
| DE | 2237019 | 2/1973 |
| DE | 25159 | 12/1983 |
| DE | 19803901 | 8/1999 |
| EP | 0113913 | 7/1984 |
| EP | 0463702 | 1/1992 |
| EP | 1010821 | 6/2000 |
| EP | 1010822 | 6/2000 |
| EP | 1010821 | 7/2000 |
| FR | 735506 | 11/1932 |
| FR | 2773373 | 7/1999 |
| WO | WO 2004/051009 | 6/2004 |
| WO | WO-2004072388 A2 | 8/2004 |
| WO | WO-2007146083 A2 | 12/2007 |
| WO | WO-2008045785 A1 | 4/2008 |
| WO | WO-2008124750 | 10/2008 |
| WO | WO-2009023780 | 2/2009 |

OTHER PUBLICATIONS

PCT/US2003/37681 International Preliminary Examination Report mailed Jan. 17, 2005.

PCT/US2007/063064 International Search Report and Written Opinion mailed Jul. 10, 2007.

PCT/US2007/063068 Invitation to Pay and Partial International Search Report mailed Aug. 2, 2007.

Mexican Patent Application No. PA/a/2005/006002 English Translations of Official Action dated Sep. 13, 2007.

PCT/US08/59715 International Search Report and Written Opinion dated Sep. 11, 2008.

PCT/US08/73181 International Search Report and Written Opinion dated Nov. 5, 2008.

EP2078117 Office Action dated Sep. 14, 2009.

PCT/US2008/059715 International Preliminary Report on Patentability dated Oct. 22, 2009.

International Search Report and Written Opinion issued by the European Patent Office for PCT/US2007/063068 mailed Nov. 21, 2007.

International Search Report and Written Opinion issued by the European Patent Office for PCT/US2007/080572 mailed Feb. 18, 2008.

* cited by examiner

# RETROFITTING A FIRE HYDRANT WITH A REPLACEMENT HYDRANT BODY CONTAINING A SECONDARY VALVE

CROSS REFERENCE TO RELATED APPLICATIONS

This application is a continuation-in-part of U.S. patent Ser. No. 11/372,947, titled "Breathable Fire Hydrant Rod," filed Mar. 9, 2006, which is a continuation-in-part of U.S. Pat. No. 7,055,544, titled "Fire Hydrant With Second Valve," filed Nov. 23, 2004, which is a continuation-in-part of U.S. Pat. No. 6,868,860, titled "Fire Hydrant With Second Valve," filed Dec. 4, 2002, the entire contents of each of which are hereby incorporated by this reference.

FIELD OF THE INVENTION

Various aspects and embodiments of the present invention relate to retrofitting fire hydrants with a replacement hydrant body having additional valves in order to render more difficult the task of introducing toxins into a water supply.

BACKGROUND

Conventional fire hydrants offer access to a municipal water supply in a manner in which operatives with ill intent may appreciate. Briefly, conventional fire hydrants include at least one nozzle for coupling to a fire hose. A threaded cap closes off the nozzle when the hydrant is not in use. The hydrant also includes a hydrant valve which controls flow of water from the water supply through the hydrant, through the nozzle, and into the fire hose.

Conventionally, the barrel of the hydrant between the nozzle and the hydrant valve, which is in the lower portion of the hydrant, accommodates several gallons of fluid or solids. Accordingly, it is possible to unscrew a nozzle cap, introduce gallons of toxin, reattach the nozzle cap, and open the hydrant valve to allow the toxins to communicate with and flow, by gravity and perhaps at least to some extent by Bernoulli's principle, into the municipal water supply, since water pressure from the water supply can not force the toxins back out of the hydrant because the nozzle cap is attached.

An example of a system and method for preventing toxins from being introduced to a water supply through a hydrant is described in U.S. Pat. No. 6,868,860, entitled "Fire Hydrant With Second Valve," the entire contents of which are hereby incorporated by this reference. In some examples described in U.S. Pat. No. 6,868,860, a valve structure is introduced between the nozzle and the primary valve that makes it more difficult or impossible to introduce toxins into a water supply through a fire hydrant. The valve structure prevents or substantially prevents the flow of water through the hydrant upon certain conditions and closes off portions of the hydrant barrel when a nozzle is open but the hydrant valve is closed. Generally, the valve structure can include a seat, a restriction member, and a biasing structure.

Retrofitting fire hydrants with secondary valves may be accomplished by removing the hydrant barrel, inserting the secondary valve and affixing the seat to the hydrant body with an adhesive or mechanical means, such as a screw. While this is an effective method for installing the secondary valve, another method is needed to retrofit a fire hydrant with the secondary valve. For example, retrofitting hydrants that include an off-centered actuator rod or a different shaped barrel, such as triangular or cone can be relatively difficult and, in some cases, impossible.

SUMMARY OF THE INVENTION

One or more various structures and embodiments according to the present invention may be utilized to retrofit a fire hydrant with a replacement hydrant body containing an additional valve in order to provide a retrofitting process capable of being applied to a wide range of different hydrant configurations. A structure such as the replacement hydrant body may allow quick installation of an additional valve in a fire hydrant to close off portions of the hydrant barrel when the hydrant valve is closed to prevent the introduction of toxins into a lower barrel portion.

According to some embodiments of the present invention, a replacement hydrant body can be introduced between the cap structure and the primary valve during installation. For example, the hydrant body may be detached from the cap structure and a lower portion of the hydrant, such as at a breakaway structure or primary valve, and a replacement hydrant body, containing a primary valve, can be installed.

According to various aspects and embodiments of the present invention, the replacement hydrant body may include a secondary valve, a weeping valve, and a breathable stem. The secondary valve may include valve seat, a restriction member, and a biasing structure. During installation of a replacement hydrant body, the hydrant body may be removed and the replacement body, containing the secondary valve, installed in its place. In some embodiments of the present invention, the replacement body may include a globe containing the secondary valve. In other embodiments, the replacement body does not include a globe.

It is an object of some embodiments of the present invention to provide a replacement structure having a secondary valve and adapted to be retrofitted into existing fire hydrants in order to reduce the possibility of toxins being introduced into a water supply and provide a quick and efficient method to retrofit existing hydrants with a secondary valve.

It is an additional object of some embodiments of the present invention to provide a replacement structure having a secondary valve and adapted to be quickly installed into a fire hydrant.

It is an additional object of some embodiments of the present invention to provide more efficient drainage of liquids inside the hydrant barrel in order to reduce the possibility of hydrant freezing.

It is an additional object of some embodiments of the present invention to provide a secondary valve structure capable of restricting the flow of water in the hydrant barrel upon certain conditions.

Other objects, features, and advantages of various embodiments of the present invention will become apparent with respect to the remainder of this document.

DETAILED DESCRIPTION

Figure 1:
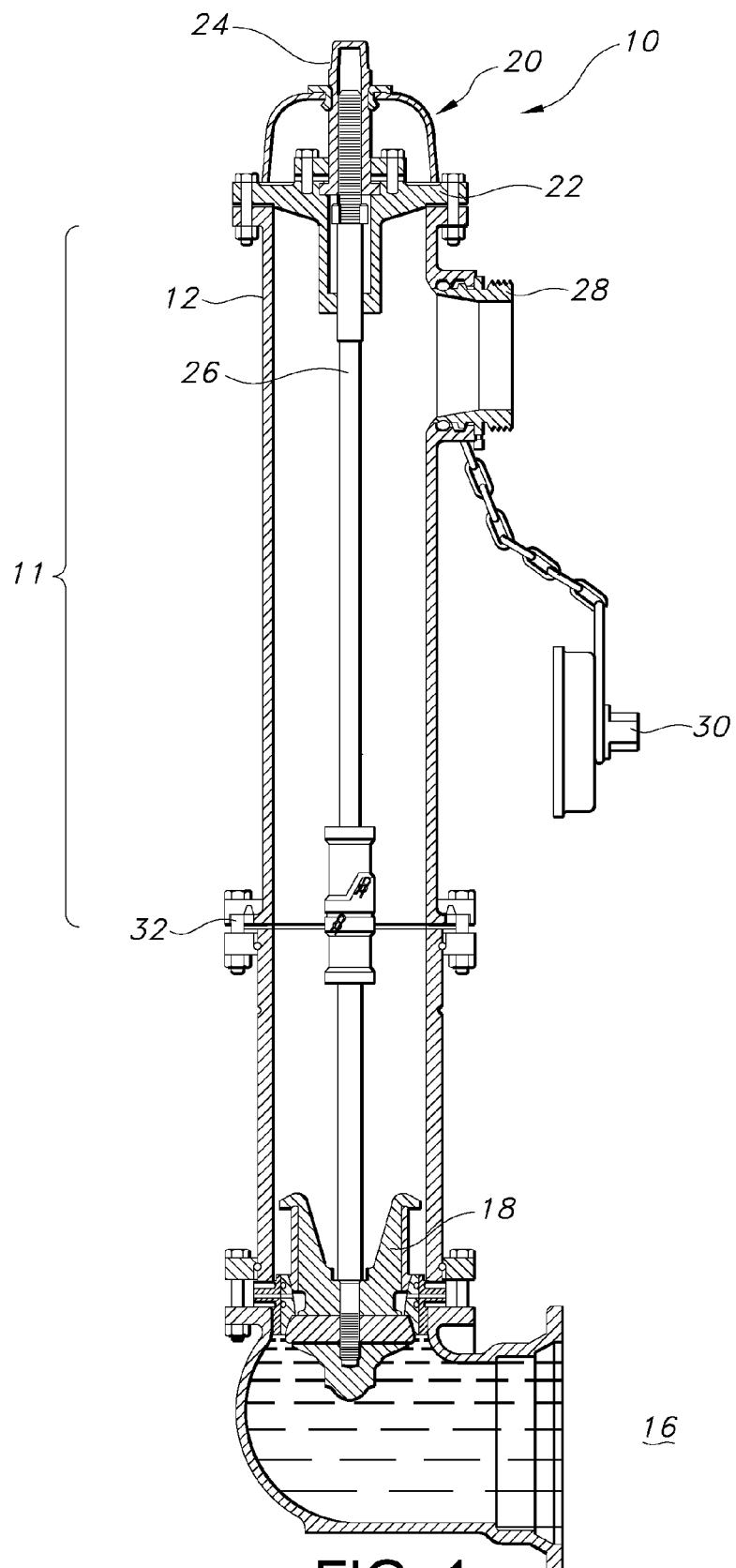
FIG. 1 is a cross-sectional view of a conventional fire hydrant.

FIG. 1 shows a conventional fire hydrant 10. Hydrant 10 typically includes a hydrant body 11 which consists of a substantially vertical barrel. Water may flow through barrel 12 from a water main 16 to a fire hose given certain circumstances as discussed generally below. At one end of the barrel 12 is a primary hydrant valve 18, which controllably interrupts fluid flow between the water supply 16 and the barrel 12. At the upper end of the barrel 12 may be found a cap structure 20 which can include, for instance, a housing cover 22 and an operating nut 24 which rotates within the housing cover 22. The operating nut 24 includes threads, which receive threads on an actuator rod 26, which in turn connects to the primary hydrant valve 18. Not only does the cap structure 20 seal the top portion of the barrel 12 to prevent the flow of water, but operating nut 24 may be used by fire fighters or others to open the primary hydrant valve 18 via actuator rod 26. Hydrant 10 includes at least one nozzle 28 and can include more nozzles. Each nozzle may be closed with a cap such as threaded cap 30. The hydrant may also include breakaway structure such as a traffic feature 32.

In normal operation, the hydrant 10 may be employed as follows to help fight fires, provide refreshing summer breaks for overheated urban citizens and/or their offspring, participants in road races, or for other purposes or beneficiaries. First, a hose (not shown) may be connected to nozzle 28, usually in a threaded fashion after the cap 30 has been removed. Then, after the hose is connected, operating nut 24 may be rotated with a wrench, or other tool, to cause actuator rod 26 to push down on relevant portions of primary hydrant valve 18 in order to open primary hydrant valve 18. When the primary valve 18 opens, water flows from the water supply 16 through primary hydrant valve 18 and barrel 12, out nozzle 28 into the hose and accordingly toward its desired application or destination.

Figure 2:
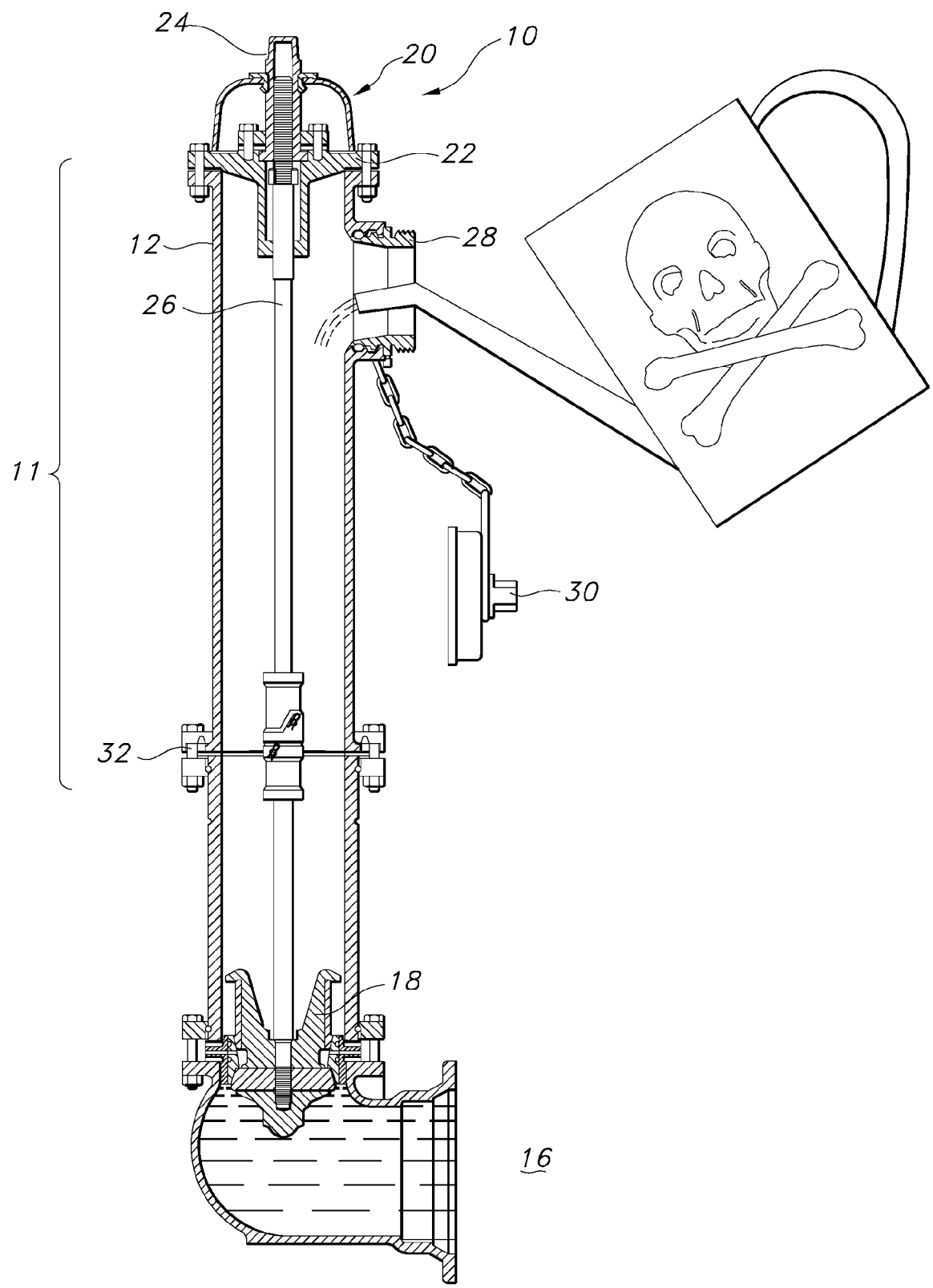
FIG. 2 shows toxins being introduced into the hydrant of FIG. 1.
Figure 3:
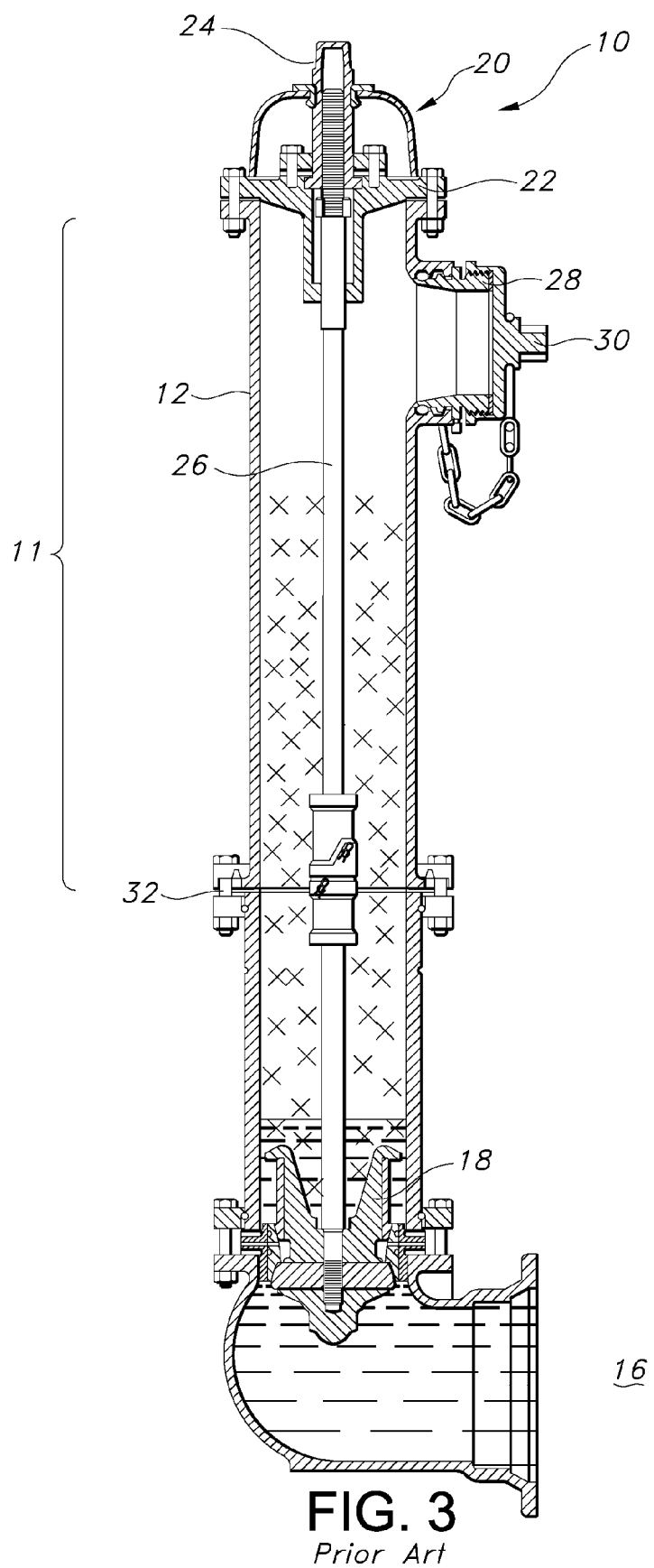
FIG. 3 shows a nozzle cap replaced on the hydrant of FIG. 1 after toxins have been introduced.
Figure 4:
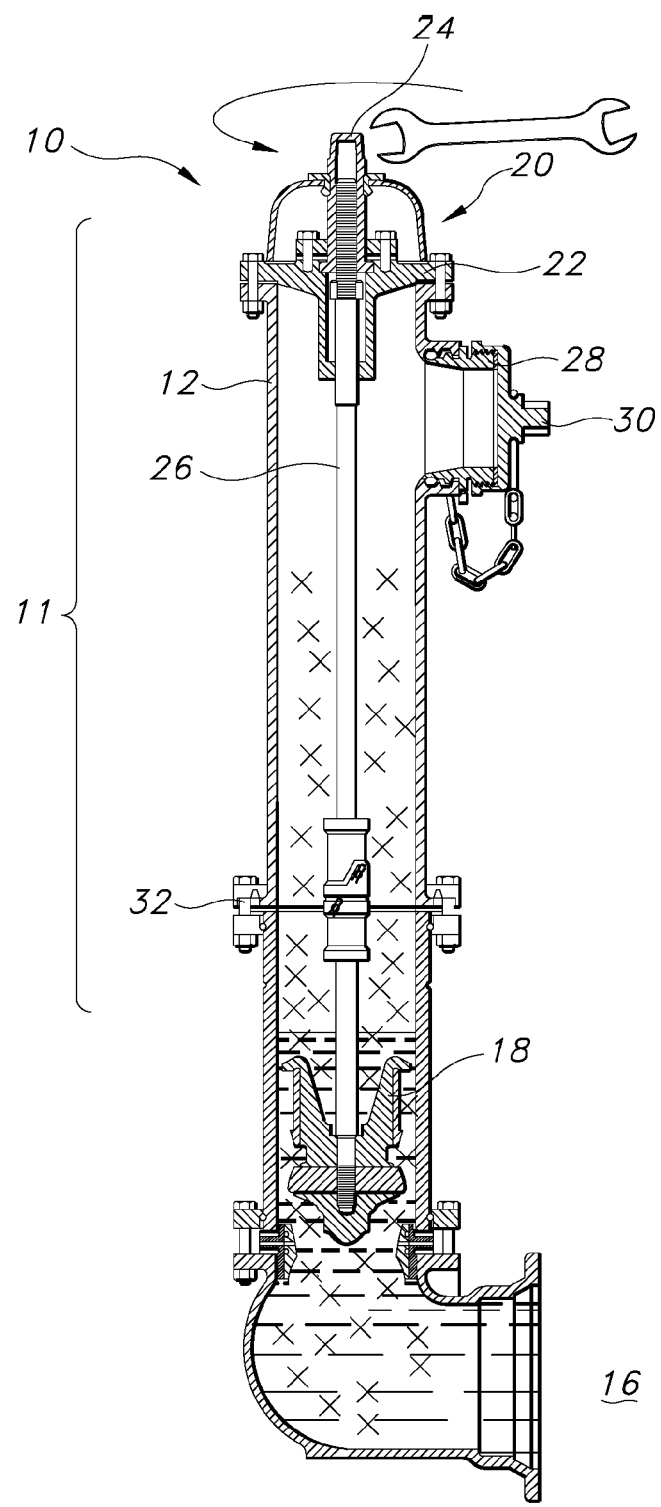
FIG. 4 shows opening of the hydrant valve of the hydrant of FIG. 1 after toxins have been introduced and the nozzle cap replaced.
Figure 5:
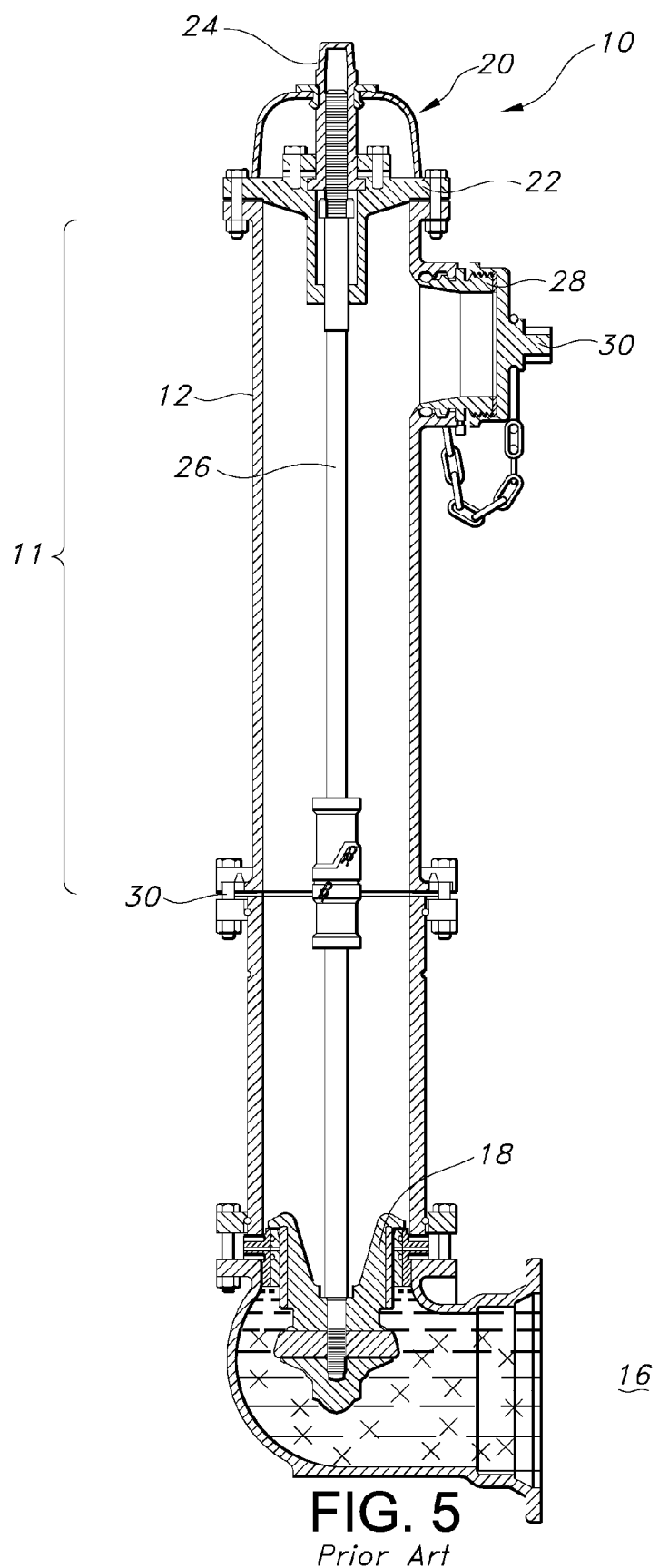
FIG. 5 shows toxins being introduced into a water supply through the hydrant of FIG. 1.

However, hydrant 10 may also be the subject of attention from miscreants who have the temerity to attempt to introduce toxins into a public water supply. Such concerns have heightened since the date known as "9-11" (Sep. 11, 2001) when terrorists activities became the focus of heightened concern. Accordingly, the need for structures to prevent such attempts became more apparent after that bellweather event, even if they were foreseen by the inventor named in this document beforehand. More particularly, a person with ill design can attempt to introduce toxins into a water supply 16 taking advantage of the fact that the barrel 12 of a hydrant 10 between the nozzle 28 and the primary hydrant valve 18 can accommodate several gallons of liquid or solid material and, for some toxins, as little as 0.05 quart can detrimentally affect a water supply. Accordingly, as shown in FIGS. 2-5, a malefactor can unscrew the nozzle cap 30 as shown in FIG. 1, introduce toxins as shown in FIG. 2, screw the nozzle cap 30 back on as shown in FIG. 3, and open the primary hydrant valve 18 as shown in FIG. 4. When the nozzle 28 or all nozzles are closed off and the primary valve 18 opened, the liquid or solid toxins in the barrel 12 can communicate with liquid in the water supply 16 in order to foul the water supply 16, as shown in FIG. 5, to the potential detriment of all those whose facilities are in communication with such water supply 16.

A physical structure may be introduced between nozzle 28 and primary hydrant valve 18 that allows water or other fluid to flow only when nozzle 28 and primary hydrant valve 18 are open. Alternatively, or in combination, such structure may close off portions of the barrel 12 below the nozzle 28 in order to deprive miscreants of at least a portion, if not all, of the space available into which to load toxins before closing the nozzle 28 and opening the valve 18.

Figure 6:
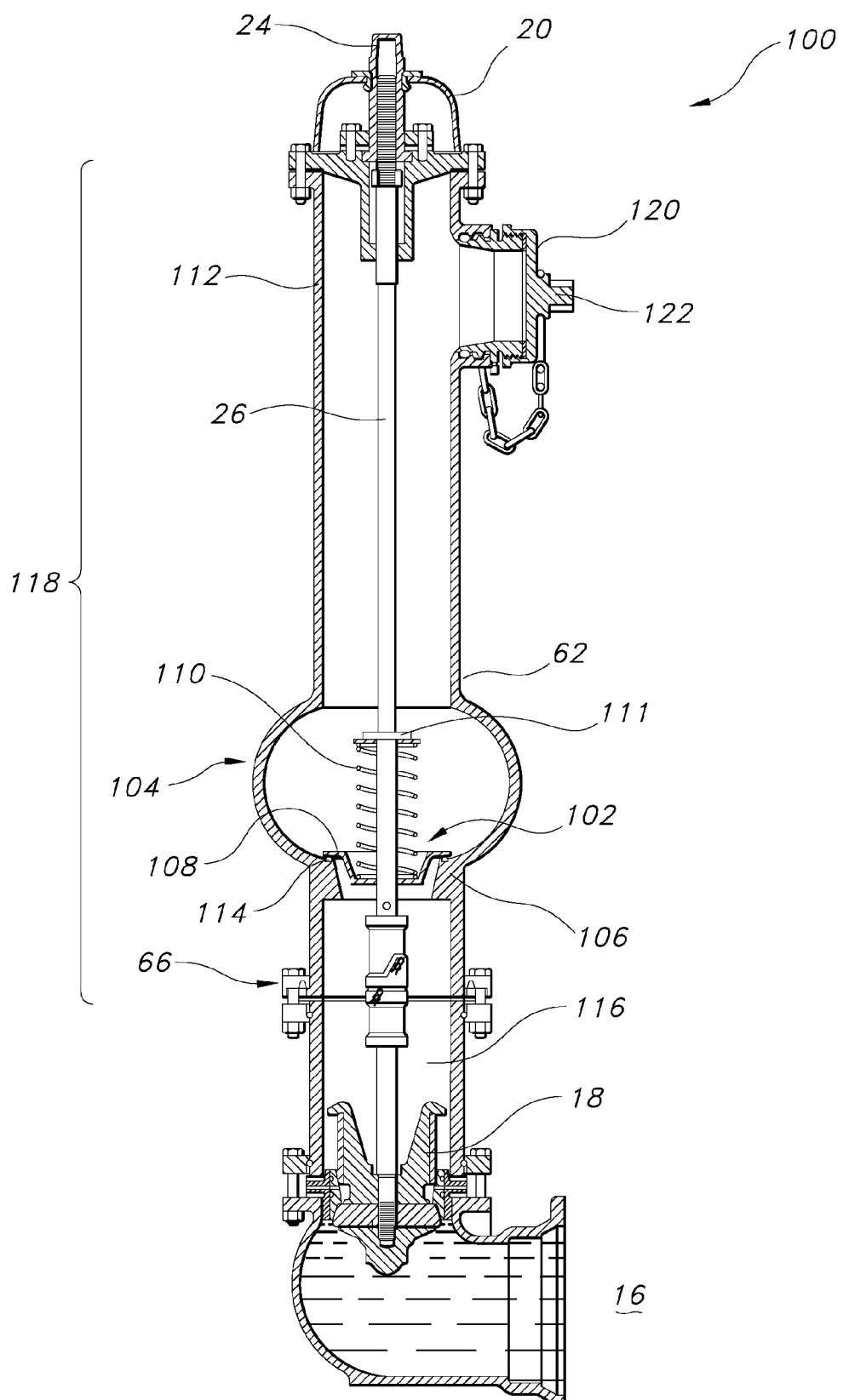
FIG. 6 is a cross-sectional view of a hydrant that has been retrofitted with a secondary valve according to one embodiment of the present invention.

An example of such a physical structure is shown in FIG. 6 as a secondary valve 102 contained in hydrant 100. The hydrant 100 may be an existing hydrant that has been retrofitted to include a replacement hydrant barrel portion 118 that includes a secondary valve 102 according to various embodiments of the present invention. The replacement hydrant barrel portion 118 may also include a enlarged diameter portion 104. The enlarged diameter portion 104 can accommodate or otherwise contain the secondary valve 102. The secondary valve 102 may include a seat 106, a restriction member 108 and a biasing structure 110. The seat 106 can be the lower portion of the enlarged diameter portion 104 or a separate structure (not shown) attached to a hydrant barrel 112. The biasing structure 110 is adapted to apply a force on restriction member 108 to form a seal with the seat 106 and at least one gasket 114 to prevent liquids or solids from reaching a lower portion of the hydrant 116 below the secondary valve 102. Examples of gasket 114 include a quad ring and an O-ring.

Secondary valve 102 may preferably be any shape to correspond generally to the inside surfaces of the hydrant 100. For example, the secondary valve 102 may be disc-shaped, rectangle, square, or any size and shape in order to cooperate with the seat 106 to obstruct the flow of water. The biasing structure 110 can be disposed to bias the restriction member 108 against gasket 114 and/or seat 106. Biasing structure 110 may include any of the following, among others: any resilient member such as, for instance, a spring, any form of resilient material shaped or formed as desired, and/or a weight applied to restriction member 108 for biasing via gravity. A restriction platform 111 may be included and is adapted to cooperate with biasing structure 110 to bias the restriction member 108 against seat 106 to close off communication between portions of the hydrant 100 above secondary valve 102 and portions below secondary valve 102.

The hydrant 100 also includes the primary valve 18 to controllably allow water to flow from the water supply 16 via actuator rod 26 and operating nut 24 and the cap structure 20 to close off an end of a hydrant 100. When the primary valve 18 is opened, the secondary valve 102 can also open, either from water pressure from water supply 16 or by moving with the actuator rod 26.

In one embodiment of the present invention, the hydrant 100 in FIG. 6 has been retrofitted with the secondary valve 102 by installing the replacement hydrant body 118 that is a portion of the hydrant 100. The replacement hydrant body 118 may include the secondary valve 100 disposed in the enlarged diameter portion 104 and a replacement nozzle 120 and replacement nozzle cap 122. In some embodiments, the original nozzle may be reattached to the replacement hydrant body 118 instead of include the replacement nozzle 120. In some embodiments, the original nozzle cap may be reattached to the replacement hydrant body 118 instead of including the replacement nozzle cap 122. The replacement hydrant body 118, as described in more detail below, may be installed by detaching the original or existing hydrant body and replacing it with the replacement hydrant body 118.

Figure 7:
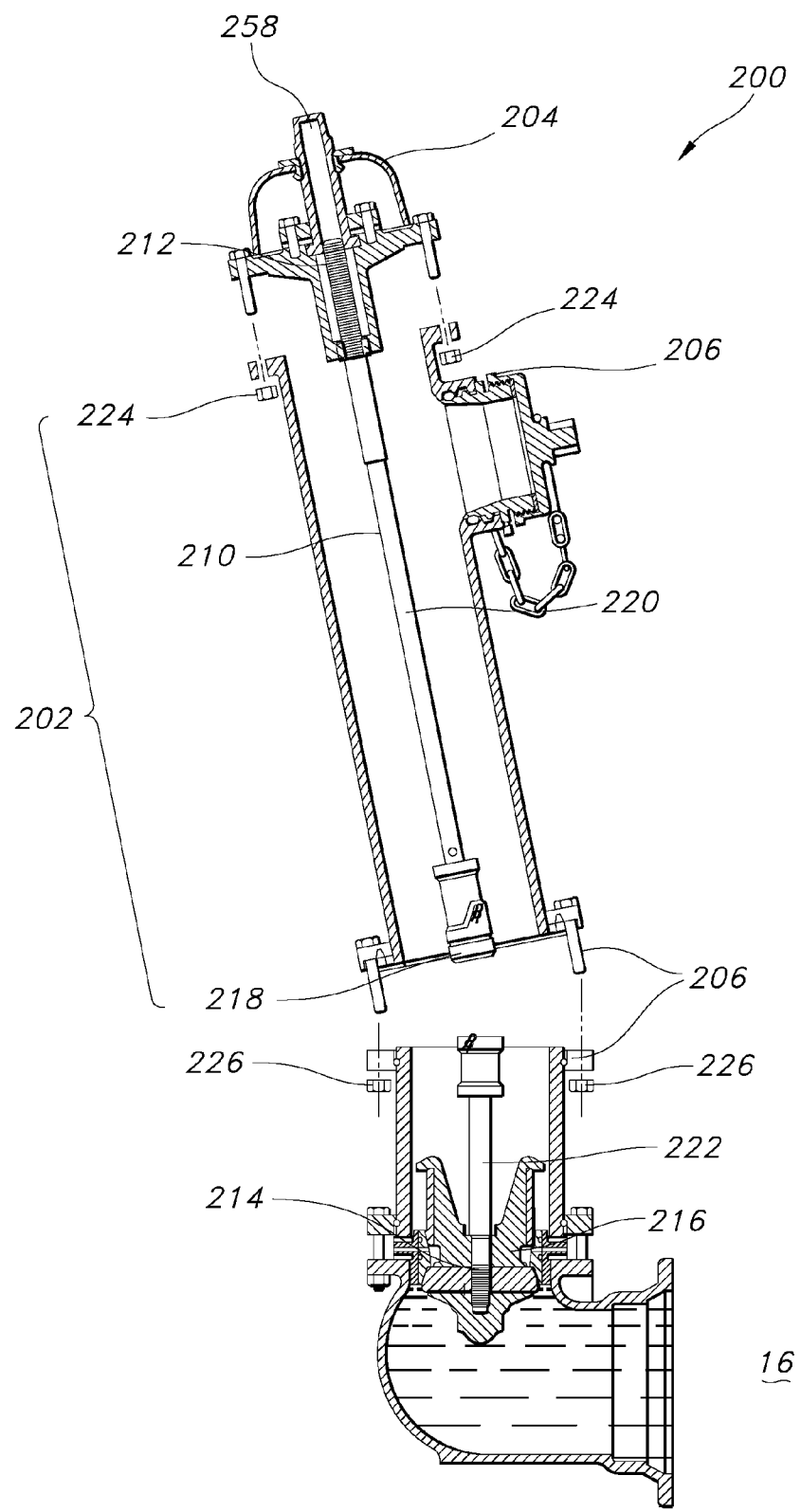
FIG. 7 shows a hydrant body being detached in a retrofit process according to one embodiment of the present invention.

A retrofitting process according to one embodiment of the present invention is shown in FIGS. 7-10. The process may begin with an existing hydrant 200 as described above with reference to FIGS. 1-5. The existing fire hydrant 200, shown in FIG. 7, can include a hydrant body 202 that is connected to a cap structure 204 and a breakaway structure, such as traffic feature 206. The hydrant body 202 may include one or more nozzles, such as nozzle 206. The hydrant body 202 may be essentially hollow and allow at least a portion of an actuator rod 210 to traverse at least a portion of the hollow area of the hydrant body 202. The actuator rod 210 may have a first end 212 that is connected to the cap structure 204 and a second end 214 that is connected to a primary valve 216. A portion of the actuator rod 210 may include a detachable portion 218 at the traffic feature 206, such that the actuator rod 210 can include a first portion 220 above the traffic feature 206 and a second portion 222 below the traffic feature. In some embodiments, actuator rod 210 may be located essentially in the center of hydrant body 202. In other embodiments, actuator rod 210 may be located close to, or essentially adjacent to, FIG. 7 shows one embodiment of a hydrant body 202 being detached from the remaining portions of the hydrant 200 in preparation for installing a replacement hydrant body with a secondary valve. The hydrant body 202 can be detached from the cap structure 204, such as by using a tool to remove bolts 224 or by otherwise disengaging any structure that connects the hydrant body 202 to the cap structure 204. Similarly, the hydrant body 202 can be detached from the traffic feature 206, using a tool to remove bolts 226 or other structure that is connecting the hydrant body 202 to the remaining portions of the hydrant 200.

In some embodiments, the actuator rod first portion 220 may be disconnected from the actuator rod second portion 222 to detach the cap structure 204 from the rest of the hydrant 200. Additionally or alternatively, the actuator rod 210, in some embodiments, may be disconnected from the cap structure 204. The actuator rod 210 can be removed from the hydrant during some retrofitting processes and a replacement actuator rod can be provided in its place.

Figure 8:
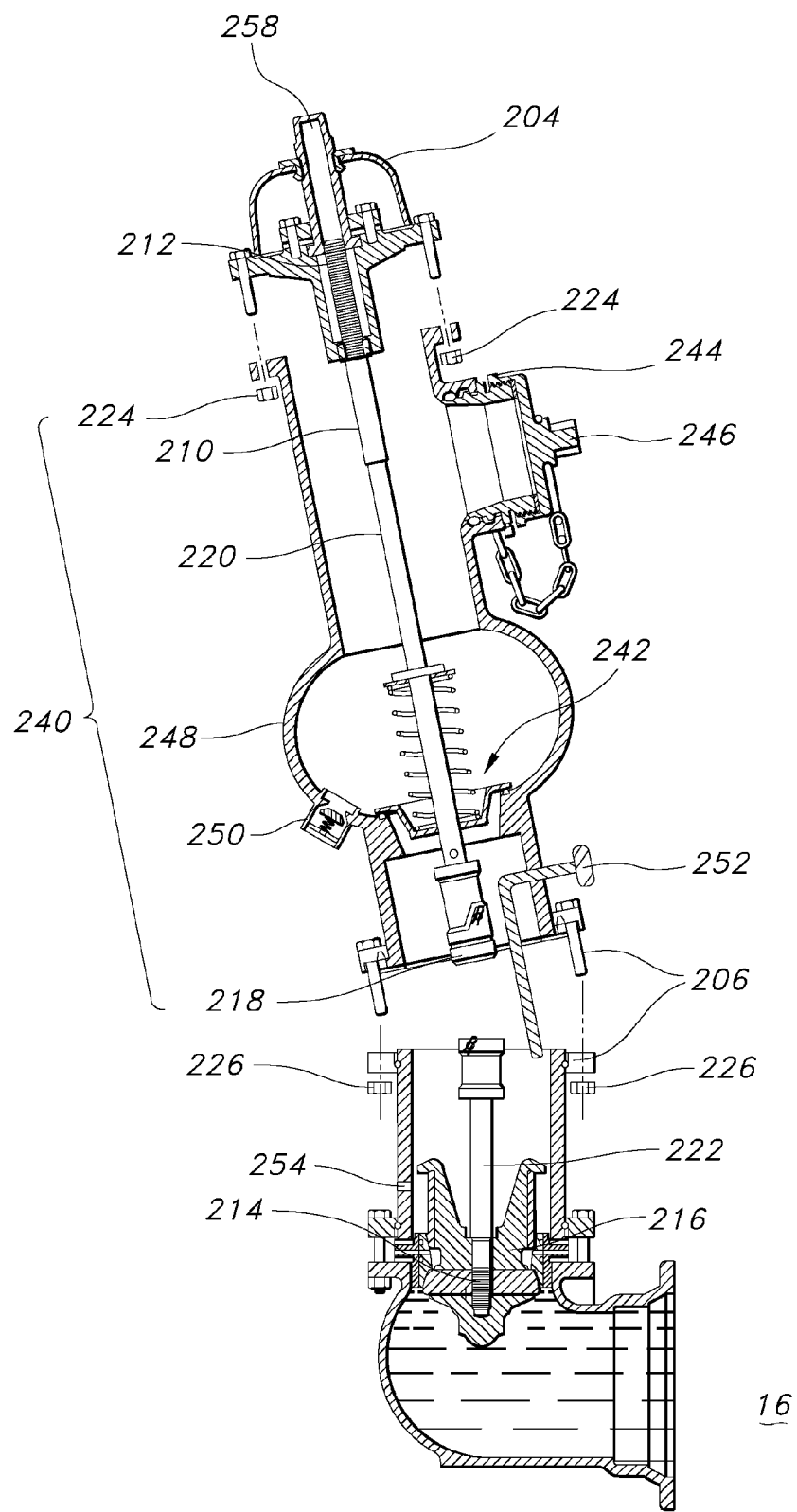
FIG. 8 shows a replacement hydrant body being installed according to one embodiment of the present invention.

After detaching the hydrant body 202, a replacement hydrant body may be provided, such as replacement hydrant body 240 shown in FIG. 8. The replacement hydrant body 240 includes a secondary valve 242 and, in some embodiments, may include a replacement nozzle 244, a replacement nozzle cap 246, and an enlarged diameter structure 248. The enlarged diameter structure 248 can contain the secondary valve 242. In a replacement hydrant body that does not include an enlarged diameter structure, portions of the secondary valve 242 may be affixed to an inner wall of the replacement hydrant body.

Figure 9:
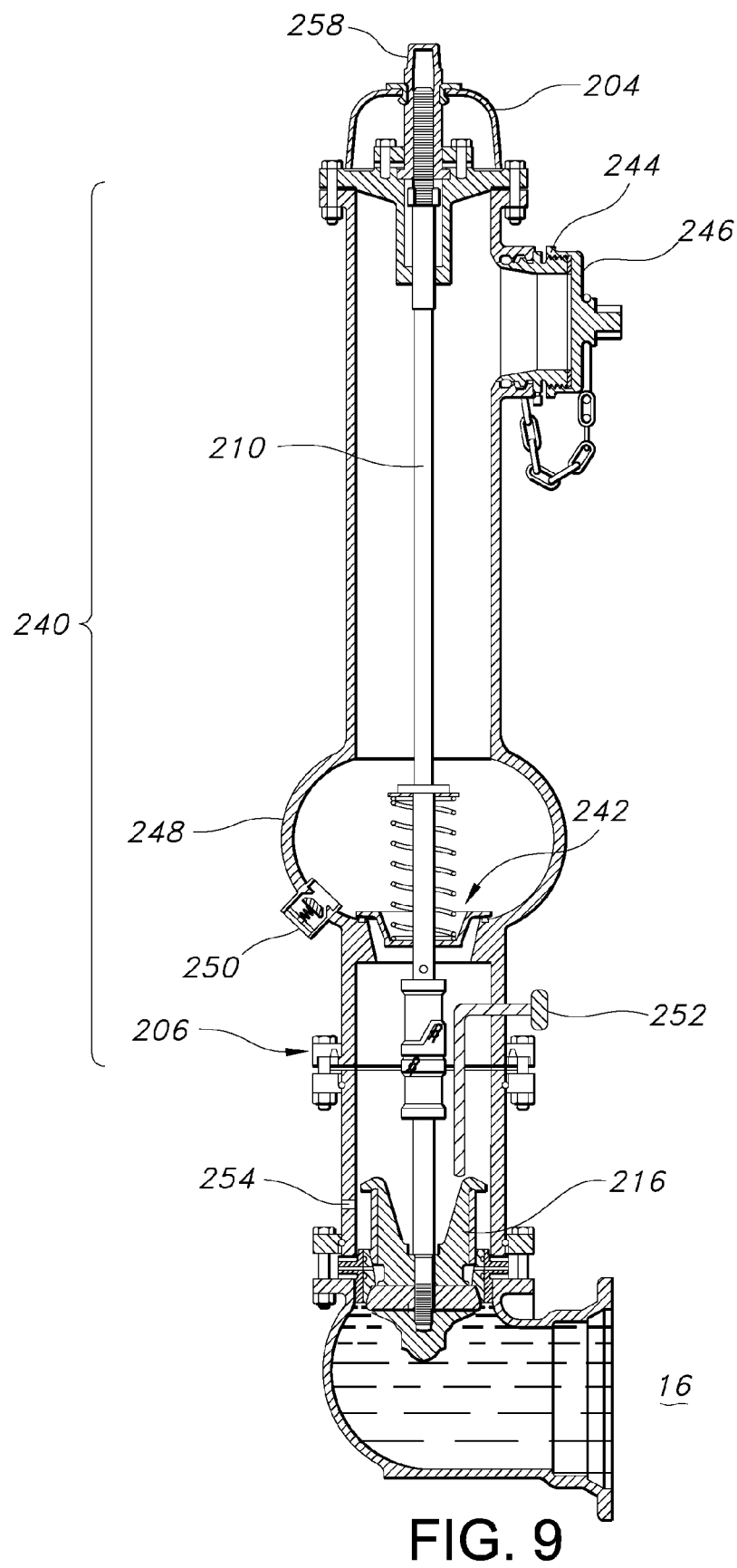
FIG. 9 shows a hydrant with an installed replacement hydrant body according to one embodiment of the present invention.

The replacement hydrant body 240 may be attached to the remaining portions of the hydrant 200 by using a tool, or otherwise, to connect the cap structure 204 and traffic feature 206 to the replacement hydrant body 240. In some embodiments, the actuator rod first portion 220 may be reconnected to the actuator rod second portion 222 and/or the actuator rod 210 may be reconnected to the cap structure 204. After connecting the replacement hydrant body 240, an assembled hydrant, as shown in FIG. 9, may be formed.

The replacement hydrant body 240, according to some embodiments, may optionally include a check valve 250 above the secondary valve 242, and a pump-out valve 252 below the secondary valve 242. After using hydrant 200 via normal operation, some water may become trapped within the hydrant 200 above the secondary valve 242. In some climates where hydrants are used, water that remains in those hydrants can, over time, damage the hydrant by freezing or evaporating creating pressure on the internal hydrant components. The check valve 250 can be optionally included in replacement hydrant body 240 to allow water that may remain in the hydrant 200 after use to drain out of the portion of the hydrant 200 above the secondary valve 242. Check valves according to some embodiments of the invention may be conventional check valves that allow fluids to flow one way, such as out of the hydrant 200, but prevent fluids or other materials from flowing other ways, such as from outside of the hydrant 200.

Hydrant 200 may also include a weep hole 254 located near a primary valve 216 to allow fluids trapped in hydrant 200 below the secondary valve 242 and above the primary valve 216 to exit the hydrant. As stated above, water remaining in hydrants may damage internal hydrant components due to changing form after exposure to certain temperatures and/or pressures. The weep hole 254 allows the water to be released from the hydrant and prevents, or substantially diminishes, the possibility of water remaining in the hydrant 200 after use.

The weep hole 254, however, must be properly maintained to allow it to properly release water remaining in the hydrant 200 after use. In some applications of hydrant 200, persons responsible for maintaining the hydrant may fail to ensure the weep hole 254 is functioning properly. For example, the weep hole 254 may become plugged or otherwise blocked, thereby preventing water from leaving the hydrant via weep hole 254. Previous methods to combat a plugged weep hole included inserting a hose through a hydrant nozzle to pump the water out or inserting anti-freeze or some other chemical into the hydrant after use to prevent or reduce liquids freezing in the hydrant. Such methods, however, may unknowingly introduce toxins into the water supply or otherwise contaminant the water supply through the hydrant. Replacement hydrant bodies, such as replacement hydrant body 240, may include the pump-out valve 252 to facilitate removal of water that may become trapped in the area of the in hydrant 200 below the secondary valve 242 and above the primary valve 216 to exit the hydrant, even if the weep hole 254 fails to function properly. The pump-out valve 252 may be a check valve that can pump water out of the area of the hydrant 200 below the secondary valve 242 and above the primary valve 216 and not require the insertion of hoses or chemicals to prevent water remaining in the hydrant 200 after use.

In some embodiments of the present invention, a breathable stem (not shown) may be included with the replacement hydrant body 240. The breathable stem may allow air from the area above the secondary valve 242 to reach the portion of the hydrant 200 below the secondary valve 242. The breathable stem may facilitate water removal via the weep hole 254 or pump-out valve 252 by allowing air to reach the area of the hydrant below the secondary valve and decrease a likelihood that a vacuum might form in that area. The breathable stem can also include a check valve to prevent fluids or solids from flowing toward the primary valve 216.

Figure 10:
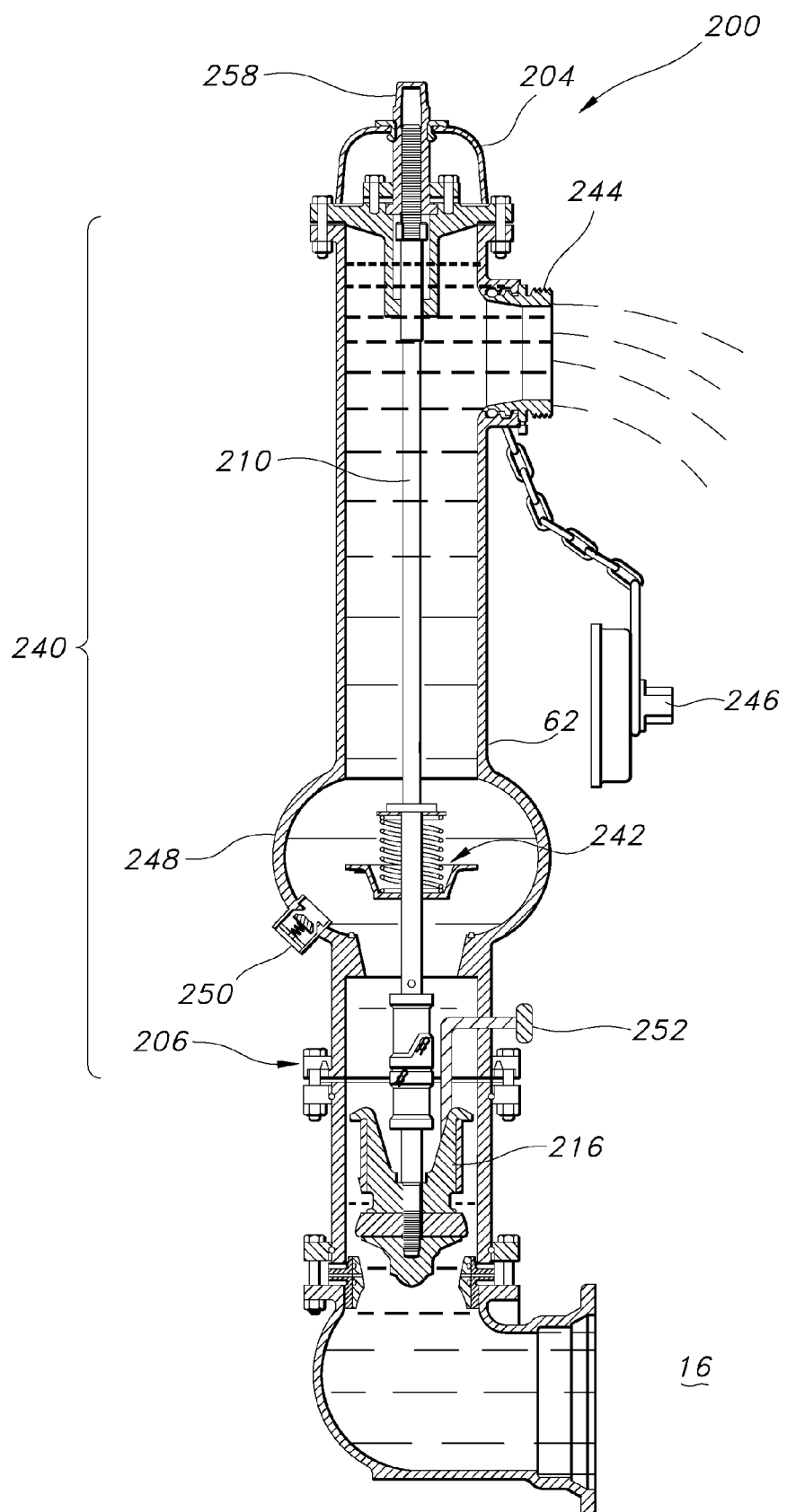
FIG. 10 shows the hydrant of FIG. 9 in normal operation.

After installation, the hydrant 200 includes the secondary valve 242 to prevent toxins from being introduced into the water supply through the hydrant 200. The hydrant 200 can resume normal operation, as shown in FIG. 10. The replacement nozzle cap 246 is removed and an operating nut 258 is rotated causing the actuator rod 204 to open the primary valve 216 and secondary valve 242 and allowing water from the water supply 16 to exit the hydrant 200 through replacement nozzle 244.

Figure 11:
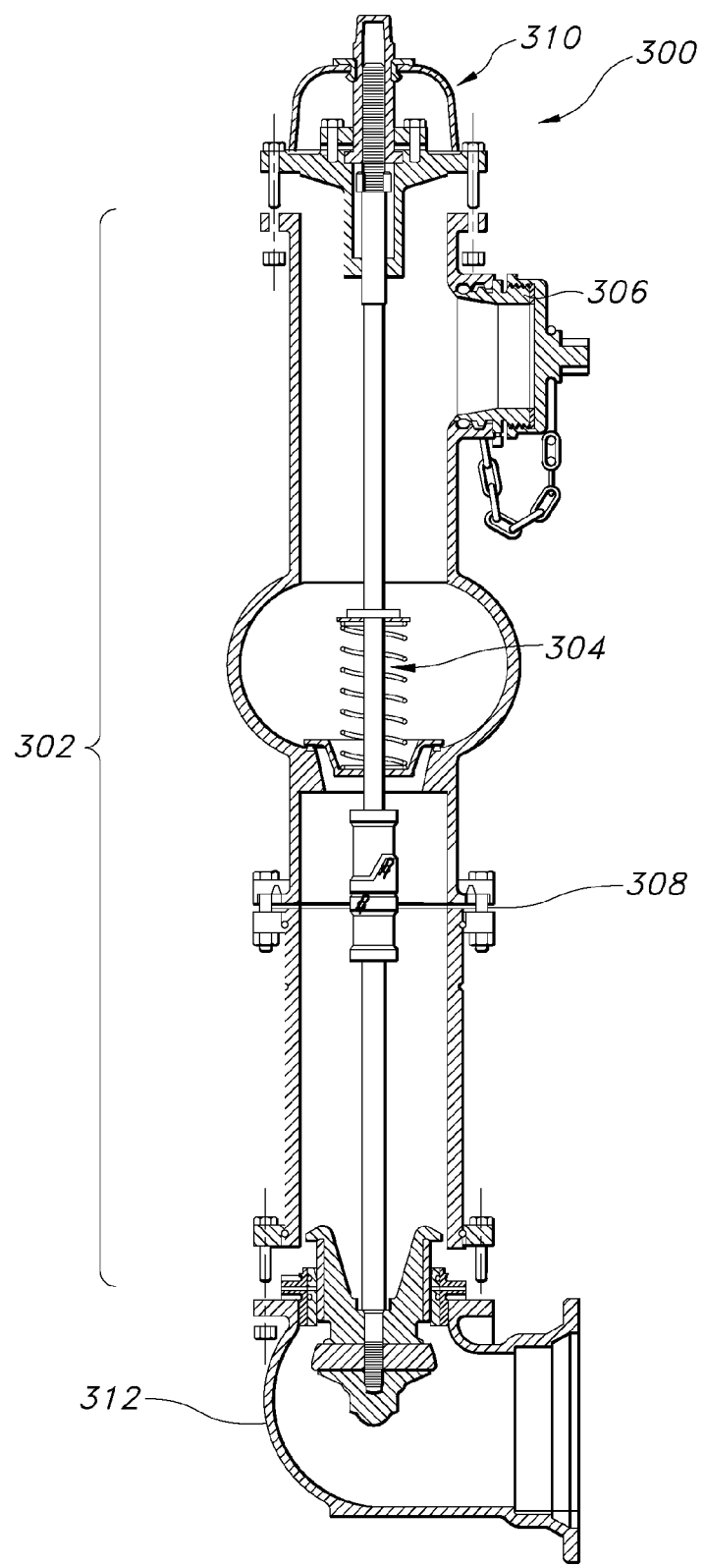
FIG. 11 shows another embodiment of replacing a portion of the hydrant body according to one embodiment of the present invention.

Replacement hydrant bodies according to various embodiments of the present invention may be any sized or shaped structure adapted to replace at least a portion of an existing hydrant and contain a secondary valve. For example, some replacement hydrant bodies may not include a hydrant nozzle and only replace a portion of the hydrant below the nozzle and above the primary valve. Other replacement hydrant bodies may be configured to replace the entire hydrant structure between a hydrant cap structure and a water supply conduit. FIG. 11 shows one embodiment of a hydrant 300 with a replacement hydrant body 302 that includes a secondary valve 304, a replacement nozzle 306, and a breakaway structure 308. The replacement hydrant body 302 is adapted to be installed between a cap structure 310 and water supply conduit 312. For example, and as shown in FIG. 11, a hydrant body extending between the cap structure 310 and the water supply conduit 312 has been removed and the replacement hydrant body 302 is about to be connected to the cap structure 310 and water supply conduit 312. The replacement hydrant body 302 may be connected to the cap structure 310 and water supply conduit 312 using bolts or other attachment structure.

Any desired physical structure may be employed in order to provide a replacement hydrant portion with a structure to preclude introduction of undesired materials into fire hydrants. Components of embodiments according to the present invention are preferably durable materials but may be of any desired material. It is conventional for many components of fire hydrants to be cast iron, bronze, and at least some or all of metallic components of structures according to various embodiments of the present invention may be formed of bronze or other conventional or even unconventional materials. For example, in some embodiments, at least some of the components, such as the replacement hydrant body, secondary valve and/or the seat, may be formed from iron and dipped in, plated, or coated with a liquid material, such as rubber, plastic, or metal such as nickel. Alternatively, in some embodiments, iron components may be encapsulated in SBR rubber or powder coated. Such processes may protect the iron components from corrosion or other types of decay. Such processes may also facilitate the seal between the valve and the seat, potentially obviating the need for a separate gasket.

O-rings or quad rings may be formed of conventional materials used in fire hydrants, or unconventional materials. Suitable resilient structures such as springs which may form biasing structures may be formed of any desired material having requisite modulus of elasticity, durability, costs, and other properties.

Modifications, adaptations, changes, deletions, and additions may be made to various embodiments of the present invention as disclosed in this document without departing from the scope or spirit of the invention.

What is claimed:

1. A method for retrofitting a fire hydrant with a replacement hydrant body comprising:
   (a) selecting a hydrant, the hydrant comprising a cap structure, a hydrant body, and a primary valve, the hydrant body comprising a nozzle;
   (b) detaching the cap structure;
   (c) removing the hydrant body;
   (d) installing the replacement hydrant body between the primary valve and the cap structure, the replacement hydrant body comprising a secondary valve, the secondary valve being adapted to prevent fluid from flowing toward the primary valve; and
   (e) connecting the cap structure to the replacement hydrant body.

2. The method of claim 1, wherein detaching the cap structure comprises:
   (a) removing at least one bolt connecting the cap structure to the hydrant body; and
   (b) detaching the cap structure from an actuator rod.

3. The method of claim 1, wherein the hydrant further comprises a breakaway structure between the primary valve and cap structure.

4. The method of claim 3, wherein removing the hydrant body comprises detaching the hydrant body from the breakaway structure.

5. The method of claim 1, wherein the replacement hydrant body comprises an enlarged diameter portion.

6. The method of claim 5, wherein the enlarged diameter portion comprises a check valve for allowing liquids to drain out of the portion of the replacement hydrant body above the secondary valve.

7. The method of claim 1, wherein the replacement hydrant body comprises a pump-out valve adapted to allow water to leave the barrel.

8. The method of claim 1, wherein the secondary valve is adapted to be open when the primary valve is open and closed when the primary valve is closed.

9. The method of claim 1, wherein the replacement hydrant body further comprises a replacement nozzle.

10. A fire hydrant that has been retrofitted with a replacement hydrant body, the fire hydrant comprising:
    (a) a primary valve for controllably allowing liquid to flow from a water conduit;
    (b) a cap structure adapted to at least close off an end of the hydrant; and
    (c) the replacement hydrant body between the primary valve and cap structure comprising:
        (i) a nozzle extending from the hydrant body; and
        (ii) a secondary valve, comprising:
            (A) a seat;
            (B) a restriction member adapted to cooperate with the seat to close off communication between portions of the barrel above the secondary valve and portions of the barrel below the secondary valve; and
            (C) a biasing structure adapted to bias the restriction member against the seat.

11. The fire hydrant of claim 10, further comprising a valve actuator adapted to allow actuation of the primary valve, said actuator comprising an actuator rod.

12. The fire hydrant of claim 10, wherein the replacement hydrant body comprises an enlarged diameter portion having a diameter at least somewhat larger than other portions of the barrel and wherein the restriction member is at least partially located within the enlarged diameter portion.

13. The fire hydrant of claim 10, wherein the replacement hydrant body further comprises a weep hole for allowing liquids above the primary valve to drain out of the barrel.

14. The fire hydrant of claim 10, wherein the replacement hydrant body further comprises a pump-out valve for allowing fluids to drain out of the barrel.

15. The fire hydrant of claim 12, wherein the enlarged diameter portion of the barrel is substantially spherical.

16. The fire hydrant of claim 11, wherein the seat is mounted to the barrel and the restriction member mounted to the rod.

17. The fire hydrant of claim 12, wherein the seat is a lower portion of the enlarged diameter portion.

18. The fire hydrant of claim 10, wherein the restriction member is substantially disc shaped.

19. The fire hydrant of claim 11, wherein the restriction member is adapted to move in registration with movement of the rod to open the secondary valve.

20. The fire hydrant of claim 10, wherein the biasing structure is a resilient structure.

21. The fire hydrant of claim 10, wherein the restriction member is adapted to open the secondary valve when the primary valve is opened and close the secondary valve when the primary valve is closed.

22. The fire hydrant of claim 10, wherein the restriction member is adapted to close the secondary valve when the primary valve is closed.

* * * * *